US010200468B2

(12) United States Patent
Leban et al.

(10) Patent No.: US 10,200,468 B2
(45) Date of Patent: Feb. 5, 2019

(54) ACTIVE AGENDA

(75) Inventors: Roy Leban, Redmond, WA (US);
Stephen Matlock, North Bend, WA (US); Matthew David Maddin, Seattle, WA (US); Michael O. Tiano, Redmond, WA (US); Kenneth L. Young, Sammamish, WA (US); Shaheeda Parveen Nizar, Redmond, WA (US); John Paul Lemire, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1808 days.

(21) Appl. No.: 10/992,226

(22) Filed: Nov. 18, 2004

(65) Prior Publication Data
US 2006/0106872 A1 May 18, 2006

(51) Int. Cl.
G06Q 10/00 (2012.01)
H04L 29/08 (2006.01)
G06Q 10/10 (2012.01)

(52) U.S. Cl.
CPC ....... H04L 67/1095 (2013.01); *G06Q 10/109* (2013.01)

(58) Field of Classification Search
CPC ................................ G06Q 10/00; G06Q 30/02
(Continued)

(56) References Cited

U.S. PATENT DOCUMENTS 6,952,660 B1 * 10/2005 Matheson .................... 703/1
7,447,608 B1 * 11/2008 Poston ................ H04L 12/1822
702/177
(Continued)

FOREIGN PATENT DOCUMENTS

EP       0 929 046      7/1999
WO       WO 00/43898    7/2000
(Continued)

OTHER PUBLICATIONS

European Search Report for European Patent Application No. EP 04 02 5052, dated Jan. 27, 2005.
(Continued)

*Primary Examiner* — Robert D Rines
(74) *Attorney, Agent, or Firm* — Michael Best & Friedrich LLP

(57) ABSTRACT

An active agenda tool is provided that may be executed at one or more networked computing devices. Each connected active agenda tool includes functionality for displaying an agenda interface and for maintaining agenda item timers. The agenda interface includes an agenda and various interactive controls. The agenda includes a plurality of editable agenda items, each having a corresponding agenda item timer maintained by the agenda tool for recording time dedicated to that agenda item during the meeting. Collateral content, which may be shared among the network computing devices, can be associated with one or more of the agenda items. Agenda data representing the displayed agenda items is changed each time a displayed agenda item is modified during the meeting. Any changes to the agenda data may be distributed to each of the networked computing devices, so that each connected agenda tool can update its agenda during the meeting.

21 Claims, 7 Drawing Sheets

(58) Field of Classification Search
USPC ...... 709/201–243; 705/7.13–7.18, 7.11–7.42
See application file for complete search history.

(56) References Cited

U.S. PATENT DOCUMENTS

| | | |
|---|---|---|
| 2002/0073114 A1 | 6/2002 | Nicastro et al. |
| 2002/0103695 A1* | 8/2002 | Urken et al. ..................... 705/12 |
| 2003/0055713 A1* | 3/2003 | Pinto et al. ..................... 705/10 |
| 2003/0105820 A1* | 6/2003 | Haims et al. ................. 709/205 |
| 2003/0182168 A1* | 9/2003 | Lyons ................................ 705/8 |
| 2003/0217073 A1* | 11/2003 | Walther et al. ............ 707/104.1 |
| 2003/0235279 A1* | 12/2003 | Richomme ................ 379/88.15 |
| 2004/0044556 A1* | 3/2004 | Brady et al. ....................... 705/8 |
| 2004/0078255 A1* | 4/2004 | Demsky et al. .................. 705/8 |
| 2004/0128179 A1* | 7/2004 | Mashiko et al. .................. 705/8 |
| 2005/0038687 A1* | 2/2005 | Galdes .............................. 705/9 |
| 2005/0050061 A1* | 3/2005 | Karstens ....................... 707/100 |
| 2005/0131714 A1* | 6/2005 | Braunstein et al. .............. 705/1 |
| 2006/0053380 A1* | 3/2006 | Spataro et al. ................ 715/753 |

FOREIGN PATENT DOCUMENTS

| | | |
|---|---|---|
| WO | WO 01/16816 | 3/2001 |
| WO | WO 02/103591 | 12/2002 |
| WO | WO 02103591 A1 * | 12/2002 |

OTHER PUBLICATIONS

Ho, Tania and Antunes, Pedro, "Developing a Tool to Assist Electronic Facilitation of Decision-Making Groups," Department of Informatic Engineering, University of Lisboa, Lisboa, Portugal, 1999 IEEE (10 pages).

* cited by examiner

Fig. 7

| C | TOPIC | TIME REMAINING | P |
|---|---|---|---|
| [x] | 1. INTRODUCTIONS | 1:33 | ☐ |
| [x] | 2. SUMMARY OF MEETING 4-12-03 | -1:40 | ☐ |
| ☐ | 3. RE-ORG PLANS<br>📊 MASTER PLANS.ppt<br>📊 RE-ORG TEAMS.xls<br>TIME LIMIT 15:00 | 8:53 | ☐ |
| ☐ | 4. STATUS REPORT: MIKE DAVIS | 10:00 | ☐ |
| ☐ | 5. LEGAL AFFAIRS | 15:00 | [x] |
| ☐ | 6. NEW BUSINESS | 10:00 | ☐ |
| ☐ | 7. CONCLUSIONS | 5:00 | ☐ |
| | ▷ ADD NEW | 0:00 | |

Buttons: APPLY CHANGES | DISCARD CHANGES (406)

Fig. 8

Buttons: MAKE CURRENT | ADD | EDIT | REARRANGE | DELETE

| C | TOPIC | TIME REMAINING | P |
|---|---|---|---|
| [x] | 1. INTRODUCTIONS | 1:33 | ☐ |
| [x] | 2. SUMMARY OF MEETING 4-12-03 | -1:40 | ☐ |
| [x] | 3. RE-ORG PLANS | 3:07 | ☐ |
| ☐ | 4. STATUS REPORT: MIKE DAVIS | 16:00 | ☐ |
| ☐ | 5. LEGAL AFFAIRS | 15:00 | [x] |
| ☐ | 6. NEW BUSINESS | 16:00 | ☐ |
| ☐ | 7. CONCLUSIONS | 11:00 | ☐ |

MEETING TIME REMAINING: 43:00
MEETING TIME LIMIT: 70:00

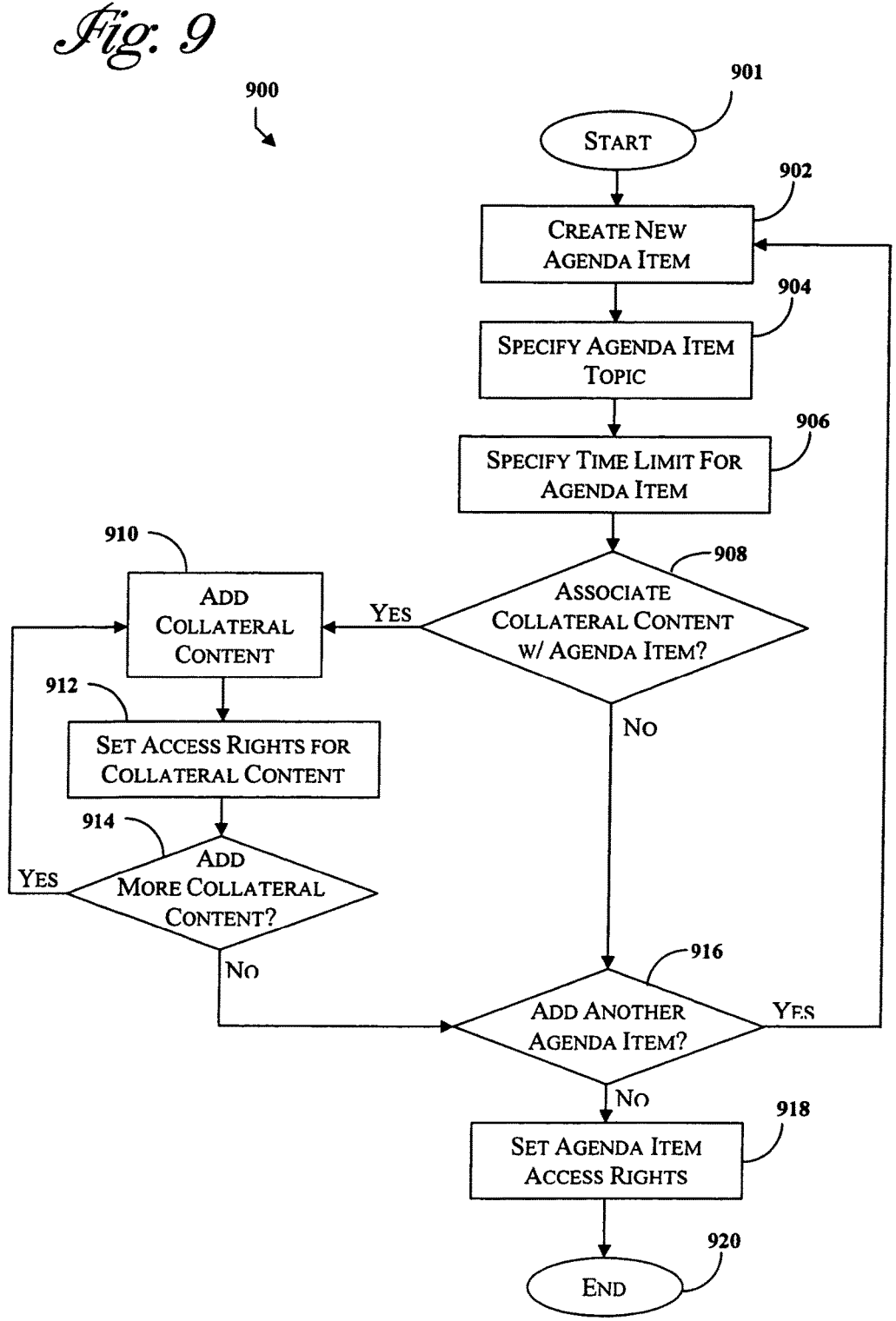

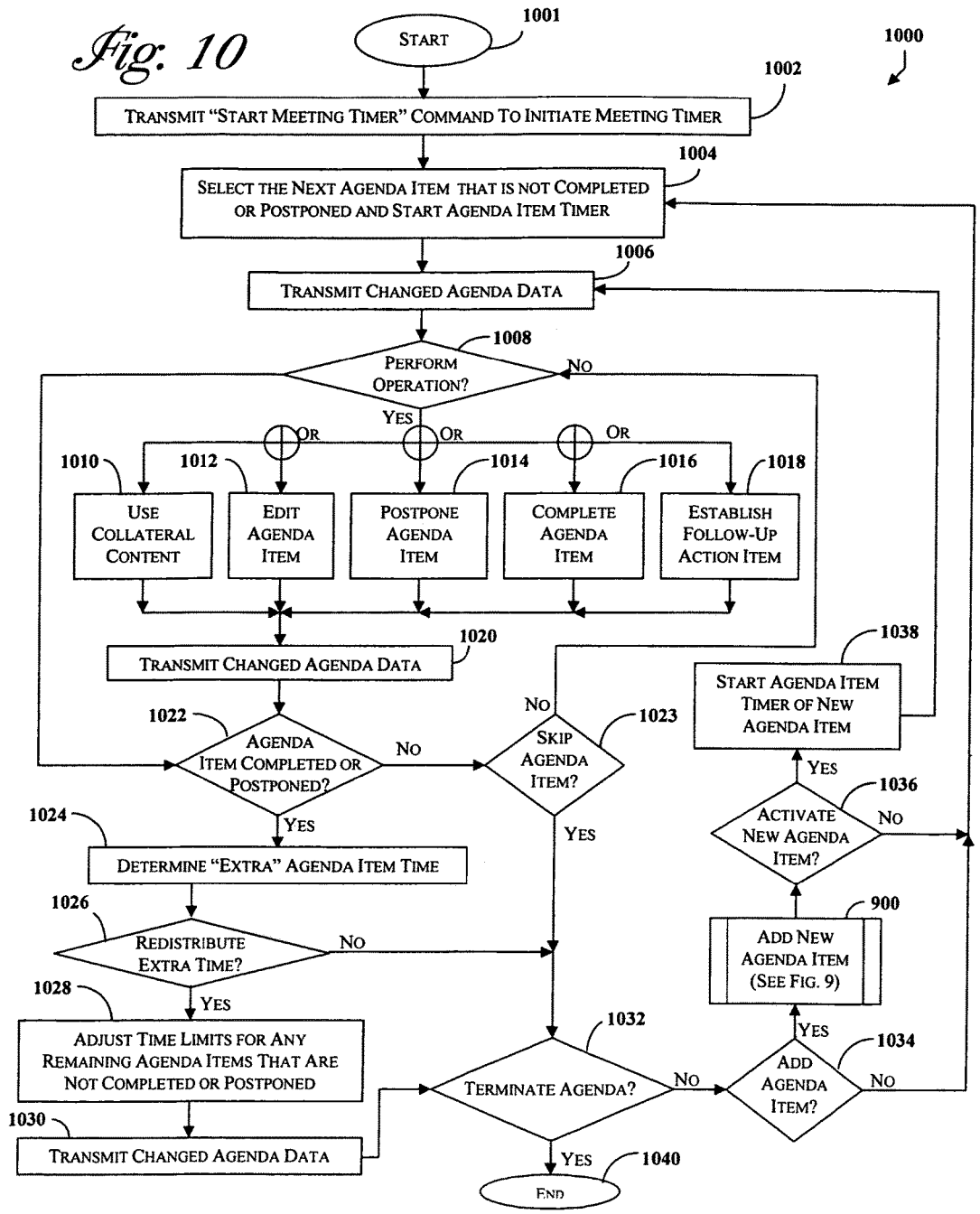

ACTIVE AGENDA

CROSS REFERENCE TO RELATED APPLICATION(S)

The present application claims priority to U.S. Provisional Application No. 60/608,948, entitled "ACTIVE AGENDA," filed Nov. 18, 2003, which is incorporated herein in its entirety by reference.

TECHNICAL FIELD

The present invention relates to meeting agendas. More particularly the present invention relates to a computer-implemented meeting agenda tool for efficient management of a meeting.

BACKGROUND OF THE INVENTION

When a structured meeting is planned, an agenda is typically defined in order to identify meeting topics in an organized manner. Prior to the meeting, the agenda informs prospective meeting attendees as to the topics of discussion, so that a decision whether to attend can be made and any necessary preparations can be undertaken. During the meeting, the agenda may serve to focus the discussions and can assist the meeting facilitator in adhering to time constraints. After the meeting, the agenda can serve as a record of topics that were discussed. A meeting that has no agenda lacks one of the primary tools for maintaining control of a meeting. This is true regardless of whether meeting attendees are located in the same room or collaborating from different locations.

An agenda typically lists the proposed topics of discussion, often referred to as agenda items, in outline form. The description of each listed agenda item may include such details as the names of the discussion facilitator(s), the objective(s) of the discussion, any documents or exhibits to be referenced during the discussion, the time allocated to the discussion, etc. Agendas have heretofore been written or printed on paper or stored as electronic documents that could be distributed among and displayed by suitably configured computing devices. Prior art agendas were often created using common software tools, such as word-processors, spreadsheets, multimedia presentation software. However, prior to the present invention, agendas did not provide any meeting management functionality beyond the information they displayed.

Accordingly, there remains a need for a computer-implemented agenda tool that actively manages a meeting by responding to status changes, scheduling follow-ups, and providing ready access collateral content. In the context of on-line meetings, there is a further need for an active agenda tool that provides automatically updated agenda data when possible to all connected attendees.

SUMMARY OF THE INVENTION

The present invention meets the above described and other needs by providing systems, methods and interfaces for managing a meeting using a computer-implemented active agenda tool. In accordance with certain aspects of the invention, a method for managing a meeting with the inventive active agenda tool involves displaying an agenda interface which includes an agenda and a plurality of interactive controls. The agenda includes editable agenda items, each having a corresponding agenda item timer for recording time dedicated to that agenda item during the meeting. During the meeting, each agenda item is selected for discussion in a predetermined or user-specified order. When an agenda item is selected as the current agenda item for discussion, its corresponding agenda item timer is initiated in order to record the time dedicated to the discussion. The current agenda item is then marked as completed when the discussion is concluded. In response to marking the current agenda item as completed, its corresponding agenda item timer is stopped and the time dedicated to the discussion may be displayed.

A meeting timer may also be maintained to record the elapsed time of the meeting. Also, each agenda item may have a specified time limit. When an agenda item is marked as completed, a time differential between the time dedicated to the discussion and the specified time limit may be determined. The time differential may optionally be displayed in the agenda. As another optional feature, the time differential may be redistributed between one or more of the agenda items that are not marked as completed. Each agenda item is editable before, during and after the meeting. One or more of the agenda items may have associated collateral content that may be displayed during the meeting. Collateral content may be stored in a local memory location or in a remote memory location.

In accordance with certain other aspects of the present invention, a method is provided for managing a meeting that involves executing the active agenda tool at each of a plurality of networked computing devices. Each active agenda tool includes functionality for displaying an agenda interface and for maintaining a plurality of agenda item timers. The agenda interface includes an agenda and a plurality of interactive controls. The agenda includes a plurality of editable agenda items, each having a corresponding agenda item timer maintained by the agenda tool for recording time dedicated to that agenda item during the meeting.

Displayed agenda items correspond to agenda data that is stored on a computer-readable medium, either in a local or remote storage device. The agenda data may be changed or updated each time at least one of the displayed agenda items is modified during the meeting via one or more of the interactive controls. Any changes to the agenda data may then be distributed to each of the networked computing devices, so that each agenda tool can update its agenda during the meeting. An agenda item may be selected as the current agenda item for discussion and its corresponding agenda item timer may be initiated.

The current agenda item is marked as completed when the discussion is concluded. Marking the agenda item as completed causes the agenda data to be changed and such changes may be distributed to the networked computing devices. Agenda items may also be marked as postponed in order to defer or complete at a later time a discussion related thereto and/or edited in various other manners. Marking the agenda item as postponed or otherwise editing the agenda item also causes the agenda data to be changed and such changes may be distributed to the networked computing devices.

Collateral content may be associated with one or more of the agenda items. The collateral content may be shared among each of the agenda tools by distributing a copy of the collateral content to each of the networked computing devices. Alternatively, the collateral content may be shared by providing within the agenda a link to a copy of the collateral content stored in a network storage device. These and other aspects, features and functions of the present invention will be more fully described below in the following detailed description of exemplary embodiments, with reference to the appended figures.

BRIEF DESCRIPTION OF THE DRAWINGS

FIG. 7 is an illustration of an exemplary agenda interface that includes interactive controls for associating collateral content with an agenda item, in accordance with certain embodiments of the present invention.

FIG. 8 is an illustration of an exemplary agenda interface that includes functionality for automatically redistributing time across agenda items, in accordance with certain embodiments of the present invention.

FIG. 9 is a process flow diagram illustrating an exemplary method for creating an active agenda in accordance with certain embodiments of the present invention.

FIG. 10 is a process flow diagram illustrating an exemplary method for managing a meeting using an active agenda in accordance with certain embodiments of the present invention.

DETAILED DESCRIPTION OF EXEMPLARY EMBODIMENTS OF THE INVENTION

Figure 1:
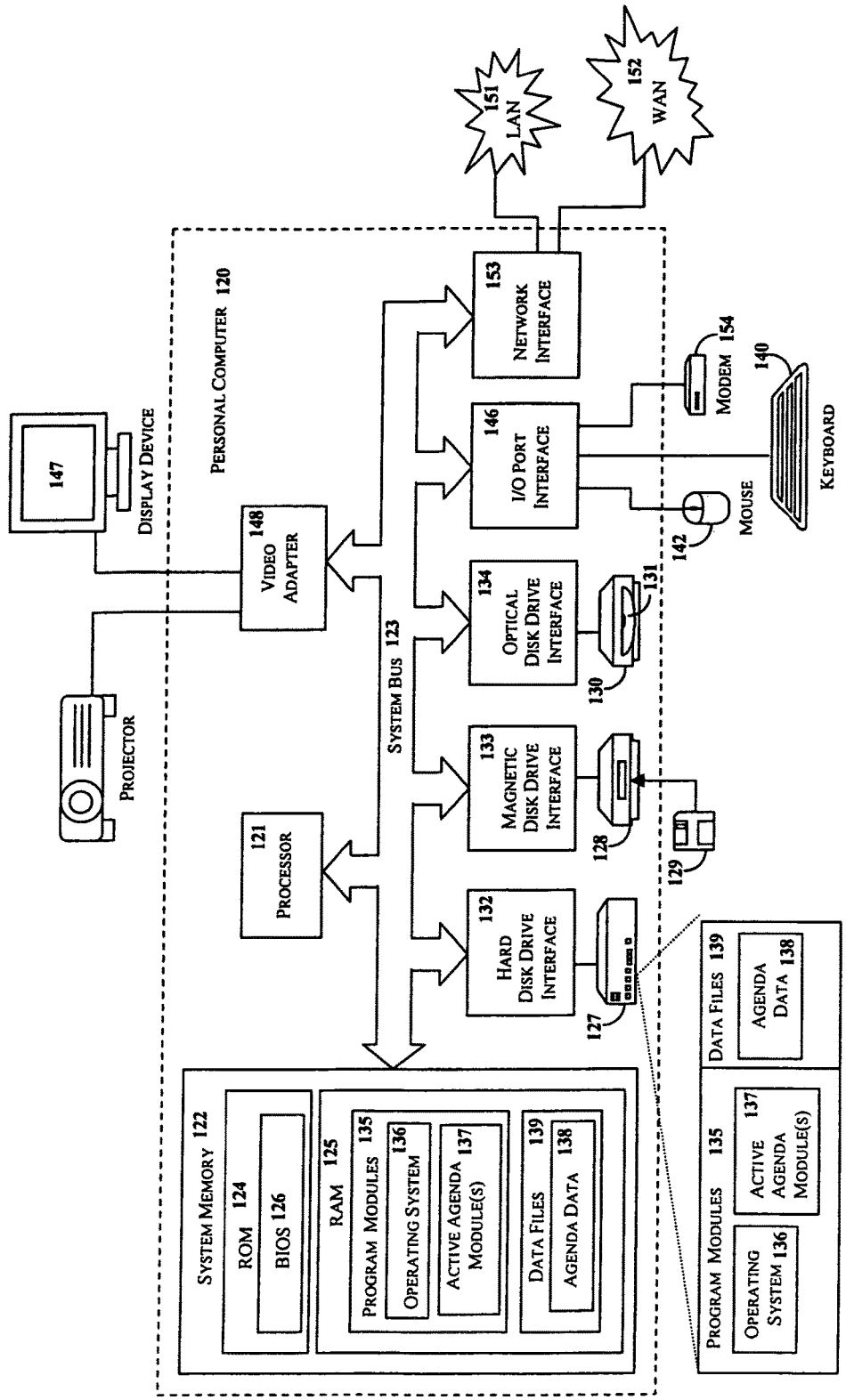
FIG. 1 is a block diagram illustrating a representative operating environment for implementation of certain exemplary embodiments of the present invention.

The present invention provides systems, methods and interfaces for implementing an active agenda tool. Using the active agenda tool of the present invention, meeting participants are able to create an agenda prior to a meeting, add or modifying agenda items, change the order of agenda items, specify the relationships between agenda items, and specify the time limits for agenda items. Agenda items can be hierarchical, allowing for sub-agenda items. During the meeting, the active agenda tool displays the agenda and maintains timers to track the total elapsed time of the meeting and the time dedicated to each agenda item.

Each agenda item of the agenda may have a specified time limit indicating the intended amount of time to be dedicated to a related presentation or discussion. The sum of all agenda item time limits might represent the meeting time limit. Alternatively, the meeting time limit may be longer or shorter than the sum of all agenda item time limits, which for example, might cause the meeting facilitator to adjust the meeting schedule during the meeting. An agenda item may be made "active" when a related presentation or discussion is initiated. Making an agenda item active may involve, among other things, activating an agenda item timer to record the elapsed time dedicated to the agenda. Making an agenda item active may also involve displaying links or pointers to collateral content or automatically opening/ displaying collateral content. As used herein, the term "collateral content" refers to any document, file, or other object that is associated with an agenda item.

During the meeting, agenda items may be selectively marked as "complete" when the related discussion is concluded. Agenda items may also be selectively marked as "postponed" if a discussion of that topic is to be deferred to a future time. Agenda items may also be selectively designated for follow-up discussion or other action items. The elapsed discussion time dedicated to a particular agenda item may be greater or less than a specified time limit for that agenda item. Accordingly, the time limits of remaining agenda items may be manually or automatically adjusted upward or downward, according to the difference between the elapsed time dedicated to an agenda item and the specified time limit of that agenda item, in order to preserve the meeting time limit.

In certain embodiments, the active agenda tool may be configured for managing on-line meetings between two or more heterogeneous connected devices. For example, each connected client device may execute an active agenda tool to display an agenda via an agenda interface. The constituent parts of the agenda, such as agenda items and their corresponding time limits and collateral content, if any, may be stored as agenda data items either in the local memory storage of one of the connected client devices or in a connected storage device. Each active agenda tool executed by a connected client device may include functionality for displaying an agenda interface template, managing timers, responding to user input, etc. Each active agenda tool may be further configured for receiving agenda data from another connected client device or from a connected server or storage device and for populating such agenda data into the agenda interface template to create an agenda interface for displaying the agenda. Modifications to the agenda data made at one connected device may be transmitted to the other connected devices, so that modifications to the agenda can be displayed in real time or near-real time.

Exemplary embodiments and operating environments of the present invention will now be described with continuing reference to the drawings, in which like numerals are intended to represent like elements throughout the several figures. Although exemplary embodiments of the present invention will be generally described in the context of software program modules and an operating system running on a personal computer, those skilled in the art will recognize that the present invention can also be implemented in conjunction with other program modules for other types of computer system configurations, including hand-held devices, multiprocessor systems, microprocessor based or programmable consumer electronics, network person computers, minicomputers, mainframe computers, and the like. Furthermore, those skilled in the art will recognize that the present invention may be implemented in a stand-alone or a distributed computing environment. In a distributed computing environment, program modules may be physically located in different local and remote memory storage devices. Examples of such distributed computing environments include local area networks, enterprise-wide computer networks, wide area networks and the global Internet.

In the detailed description that follows, the present invention is represented largely in terms of processes and symbolic representations of operations performed by conventional computer components, including processing units, memory storage devices, display devices, and/or input/output devices. In a distributed computing environment, the processes and operations described herein may be performed conventional distributed computer components, such as remote file servers, remote computer servers, remote memory storage devices and so on. The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements.

The present invention includes one or more computer program modules that embody the functions as described herein and as illustrated in the appended figures. However, it should be apparent that there could be many different ways of implementing the invention in computer programming, and the invention should not be construed as limited to any one set of computer program instructions. Further, a skilled programmer would be able to write computer program instructions to implement the disclosed invention without difficulty based on the figures and associated specification text, for example. Therefore, disclosure of a particular set of program code instructions is not considered necessary for an adequate understanding of how to make and use the present invention. The inventive functionality of the computer program will be explained in more detail in the following description in conjunction with the figures.

FIG. 1 illustrates a representative operating environment 100 for implementation of certain exemplary embodiments of the present invention. The exemplary operating environment 100 includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures, including a memory bus or memory controller, a peripheral bus, or a local bus, using any of a variety of bus architectures. The system memory 122 includes a read-only memory (ROM) 124 and a random access memory (RAM) 125. A basic input/output system (BIOS) 126, containing the basic routines that help to transfer information between elements within the personal computer 120, such as during start-up, is stored in the ROM 124.

The personal computer 120 further includes a hard disk drive 127 for reading from and writing to a hard disk (not shown), a magnetic disk drive 128 for reading from or writing to a removable magnetic disk 129 such as a floppy disk, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical disk drive interface 134, respectively. Although the exemplary operating environment 100 employs a ROM 124, a RAM 125, a hard disk drive 127, a removable magnetic disk 129, and a removable optical disk 131, it should be appreciated by those skilled in the art that other types of computer readable media which can store data that is accessible by a computer may also be used in the exemplary operating environment 100, such as magnetic cassettes, flash memory cards, digital video disks, Bernoulli cartridges, and the like. The drives and their associated computer readable media can provide nonvolatile storage of computer-executable instructions, data structures, program modules, and other data for the personal computer 120.

A number of software program modules 135 may be stored on the ROM 124, RAM 125, hard disk drive 127, magnetic disk 129, or optical disk 131, including an operating system 136 and various other program modules. Software program modules include routines, sub-routines, programs, objects, components, data structures, etc., which perform particular tasks or implement particular abstract data types. In accordance with an exemplary embodiment of the present invention, one or more active agenda program modules 137 (also collectively referred to herein as an "active agenda tool") may be stored within a suitable storage device of the personal computer 120. The one or more active agenda program modules 137 comprise computer-executable instructions for performing agenda-related functions, including but not limited to displaying agenda data, managing timers, providing interfaces for creating and modifying agenda items and managing collateral content, responding to user input commands, etc. Agenda data 138 may be stored in one or more data files 139, which may also reside in one or more suitable storage devices of the personal computer 120.

A user may enter commands and information to the personal computer 120 through input devices, such as a keyboard 140 and a pointing device 142. The pointing device 142 may include a mouse, a trackball, or an electronic pen that can be used in conjunction with an electronic tablet. Other input devices (not shown) may include a microphone, joystick, game pad, satellite dish, scanner, or the like. These and other input devices are often connected to the processing unit 122 through a serial port interface 146 that is coupled to the system bus 123, but may be connected by other interfaces, such as a parallel port, game port, a universal serial bus (USB), or the like. A display device 147, such as a monitor, may also be connected to system bus 123 via an interface, such as a video adapter 148. In addition to the display device 147, the personal computer 120 may include other peripheral output devices (not shown), such as speakers and a printer.

The personal computer 120 may operate in a networked environment using logical connections to one or more remote computers. The remote computer may be another personal computer, a server, a client, a router, a network PC, a peer device, or other common network node. The remote computer typically includes many or all of the elements described above relative to the personal computer 120. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, software program modules 135 depicted relative to personal computer 120, or portions thereof, may also be stored in the remote memory storage device 150. For example, the remote memory storage device may include an e-mail client and an Internet web browsing client. It will be appreciated that the network connections shown are exemplary and other means of establishing a communications link between the computers may be used.

Figure 2:
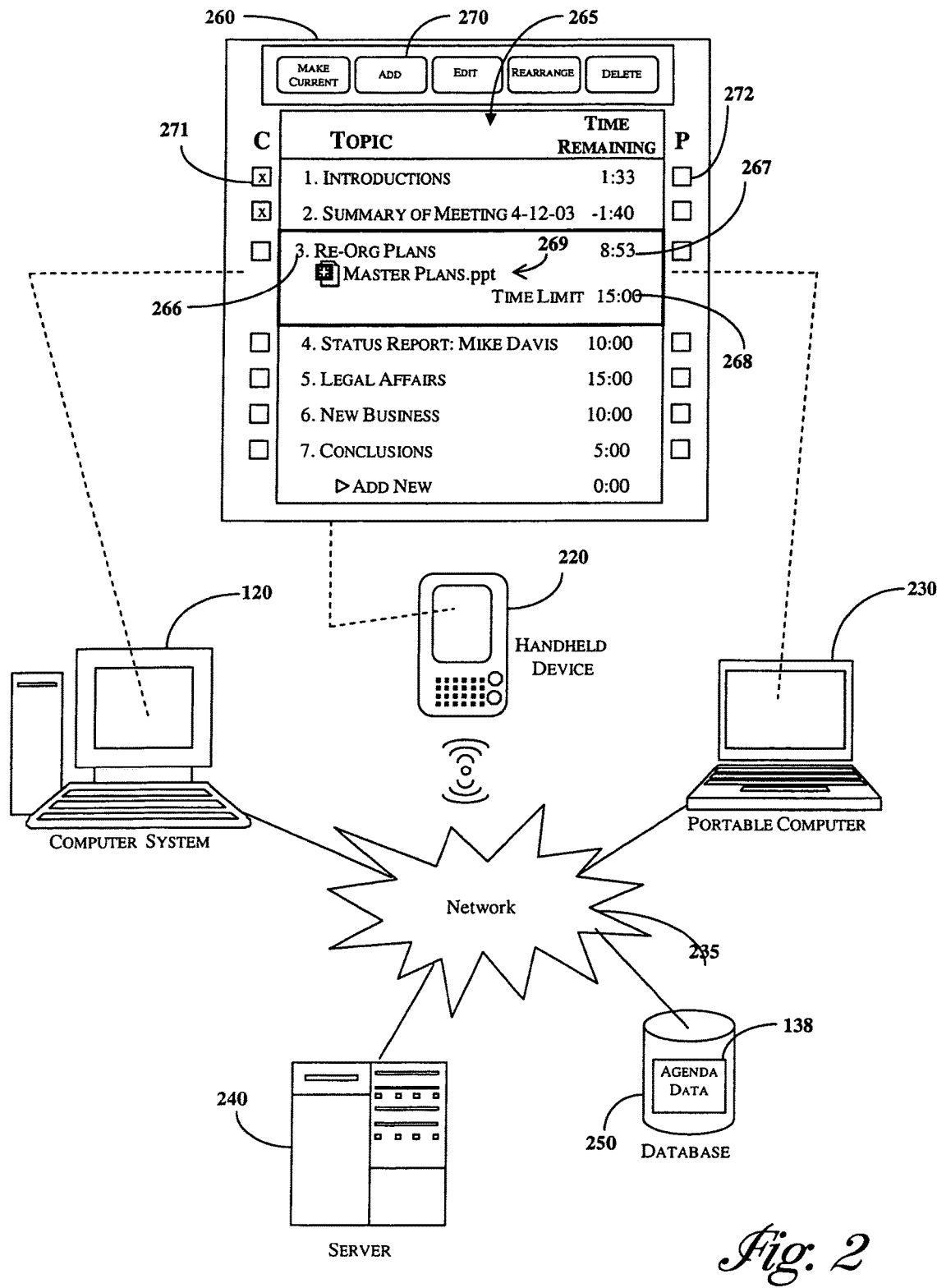
FIG. 2 a block diagram illustrating a representative networked operating environment for implementation of certain embodiments of the present invention.

Referring now to FIG. 2, a block diagram is shown that further illustrates a representative networked operating environment for implementation of certain embodiments of the present invention. The representative networked operating environment includes two or more networked computing devices, such as a personal computer 120, a handheld device 220 (e.g., handheld computer, personal digital assistant, mobile phone, interactive pager, etc.), a portable computer 230 (e.g., laptop computer, table computer, etc.). Any number and type of networked computing devices may be included in the networked environment. The networked computing devices may operate as client and/or server devices. The exemplary network environment may also include a networked storage device, such as a database 250.

Networked devices typically communicate via a network 235, but may also or alternatively communicate via direct communication links, etc. The network 235 may include any communications and/or data network infrastructure. The network 235 may include wired and/or wireless communications mediums and may utilize any one or more suitable communication protocols. Those skilled in the art will be sufficiently familiar with computer networking that a more detailed explanation of the general principles involved is not warranted herein.

Each networked computing device may include some or all of the components described with respect to the personal computer 120 of FIG. 1, as well as additional or alternative components. At a minimum, each networked computing device includes at least a processor 121 for executing one or more active agenda program modules 137 and an output device (e.g., a display device 147) for presenting an agenda interface 260 to the user. Each networked device preferably, but not necessarily, includes its own local memory device, e.g. RAM 125, for storing such things as program modules 135 and data files 139. Thus, in certain embodiments, the active agenda program module(s) 137 may be stored and executed locally by each networked computing device. In other embodiments, the active agenda module(s) 137 may be stored and/or executed at a server 240 that is accessible by one or more networked client computing devices.

As mentioned above, the active agenda program module(s) 136 may include functionality for displaying an active agenda interface 260. As used herein, the term "active agenda interface" 260 is meant to refer to the graphical user interface representing an active agenda 265, including its agenda items 266 and any associated agenda timers 267, time limits 268, collateral content 269, etc., as well as all interactive controls (e.g., command buttons 270, dialog boxes, menus, drag & drop functionality, check-boxes 271 & 272, interactive menus and the like. In accordance with certain embodiments, the active agenda program module(s) 137 may be configured to retrieve or receive an agenda interface template and agenda data 138 from a local or remote memory storage location. The active agenda program module(s) 137 may then populate relevant agenda data 138 into designated fields of the agenda interface template to create the active agenda interface 260.

An active agenda 265 may be created by a person facilitating a meeting or any other individual or group. Prior to the meeting, the agenda data 138 corresponding to the active agenda 265 may be stored in a local or remote memory storage location and may be shared, if desired, with proposed meeting attendees and/or others. Agenda data 138 may be stored in one or more data files 139. The active agenda 265 may be modified as many times as desired prior to the meeting, with each modification resulting in modified, deleted or added agenda data 138. Access privileges may be set to specify those individuals who are authorized to modify the active agenda 265.

When agenda data 138 is shared among computing devices, it may be delivered in the form of one or more complete data files 139. In certain embodiments, however, one or more of the networked computing devices may maintain a local copy of the agenda data 138, which makes it necessary to deliver only newly added, deleted or modified portions of the agenda data 138 to those devices. In such embodiments, selected agenda data items may be parsed from the agenda data 138 and may be delivered as a data file 139, data stream, etc. Those skilled in the art will be familiar with various software programs and method for synchronizing two or more data sources, any of which may be employed in connection with the present invention.

During a meeting, one of the networked computing devices may function as the meeting facilitator device and the other networked computing devices may function as meeting participant devices. Access privileges may be set for the active agenda 265 such that only the meeting facilitator, or any other subset of meeting participants, is authorized to make changes to the active agenda 265 during a meeting. Any modified or new agenda data 138 or an indication of deleted agenda data 138 may be transmitted from the meeting facilitator device to the other meeting participant devices, so that all meeting participants can view the modified active agenda 265. Otherwise, the meeting facilitator device may transmit any modified or new agenda data 138 or an indication of deleted agenda data 138 to a central storage location, such as a networked database 250, which can be periodically accessed by the meeting participant devices.

In other embodiments, one or more meeting participants could also be authorized to make changes to the active agenda 265 during a meeting. Any modified or new agenda data 138 or an indication of deleted agenda data 138 may be transmitted from the networked computing device at which the changes to the active agenda 265 were made to the other networked computing devices. Otherwise, the networked computing device that made changes to the agenda may transmit the modified or new agenda data 138 or an indication of deleted agenda data 138 to a central storage location for subsequent access by other networked computing devices. Changes made to an active agenda 265 during a meeting may include, but are not limited to, adding, deleting or editing agenda items 266, adding or removing collateral content 269 associated with an agenda item 266, increasing or decreasing agenda item time limits 268, marking agenda items 266 as "complete" or "postponed" (e.g., by checking one or more corresponding checkboxes 271 & 272) indicating that follow-up actions are required for agenda items 266 and rearranging the order of agenda items 266.

The active agenda program module(s) 137 may include timer functions or may interface with a system clock managed by the operating system 136 of the computing device. Timers, which may include agenda timers 267 and a meeting timer, may or may not be displayed. By way of example only, the exemplary active agenda 265 shown in FIG. 2 display agenda item timers 267, but does not display a meeting timer. Displayed timers 267 may count upward from zero or may count downward from a specified time limit 268. In certain embodiments, the time limits 268 specified for agenda items 266 and for meetings are not "hard" time limits, meaning that the relevant timers 267 will continue to run after the allotted time has expired. Time in excess of the specified time limit may be indicated, for example by restarting the timer to count up from zero with a minus sign (−), a plus sign (+) or some other suitable indicator displayed beside the timer display. Those skilled in the art will appreciate that there are many other ways to implement and utilize timers, all of which are considered to be within the scope of the present invention.

In certain embodiments, the meeting facilitator device maintains and manages a meeting timer to track the elapsed and/or remaining time of the meeting and individual agenda item timers 267 to track elapsed and/or remaining discussion time dedicated to each agenda item 266. In such embodiments, the meeting facilitator device may periodically compare elapsed times to specified time limits 268 to determine the meeting time remaining and/or the discussion time remaining for an agenda item 266. Remaining-time values may be transmitted to other meeting participant devices as updated agenda data items. In other embodiments, each meeting participant device may maintain and manage its own timer or timers to track elapsed and/or remaining meeting time and elapsed and/or remaining discussion time dedicated to agenda items 266. In such other embodiments, the timers maintained by different networked computing devices may optionally be synchronized from time to time.

Figure 3:
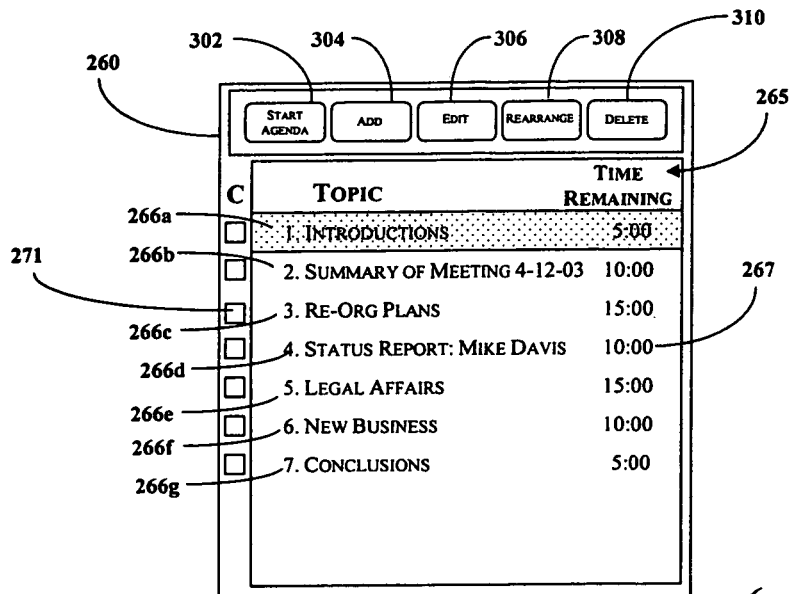
FIG. 3 is an illustration of an exemplary agenda interface as it may exist prior to a meeting, in accordance with certain embodiments of the present invention.

The functionality and utility of the active agenda tool of the present invention will be more fully understood by those skilled in the art after an examination of the representative active agenda interfaces shown in FIGS. 3-8, in conjunction with the following description thereof. In FIG. 3, an exemplary agenda interface 260 is shown as it may exist prior to a meeting. The exemplary agenda interface 260 displays an active agenda 265 and various command buttons 270, such as a "Start Agenda" button 302 (which may toggle to "Stop Agenda") for activating and deactivating agenda and meeting timers, an "Add" button 304 for adding an agenda item 266, an "Edit" button 306 for invoking an edit mode to edit a selected agenda item 266, a "Rearrange" button 308 for changing the position of a selected agenda item 266, and a "Delete" button 310 for deleting a selected agenda item 266. Selected or "current" agenda items 266 may be indicated by way of high-lighting or some other visual differentiator.

Agenda items 266 may be displayed, for example, in hierarchical form and each agenda item 266 may have a corresponding agenda item timer 267. In the example of FIG. 3, agenda item timers 267 count down from the specified time limit 268 and therefore display time remaining for each agenda item 266. Extra time dedicated to an agenda item is indicated, in this example, with a minus sign (−) (see FIG. 5). The representative active agenda 265 of FIG. 3 includes seven agenda items 266*a-g*.

In certain embodiments, agenda items 266 may be stored as agenda data 138 in the form of an attributed data structure. Those skilled in the art will recognize that data structure attributes may be implemented as fields into which text or other values may be entered or in which flags may be set. Agenda item attributes may thus include a "complete" attribute in which a flag may be set to indicate that the agenda item has been marked complete; a "postponed" attribute in which a flag may be set to indicate that the agenda item has been marked postponed; a "topic" attribute in which text may be entered to identify the agenda item; a "time limit" attribute into which a time limit 268 for the agenda item may be entered; a "current" attribute in which a flag may be set to indicate that the agenda item is active during a meeting; and a "collateral content" attribute in which a link or pointer to one or more collateral content items 269 may be inserted. Agenda items attributes may be set to default values, if desired. Those skilled in the art will appreciate that there are many other suitable ways to structure agenda data 138. Accordingly, the present invention is not intended to be limited to any particular form of data structure or data storage method.

Figure 4:
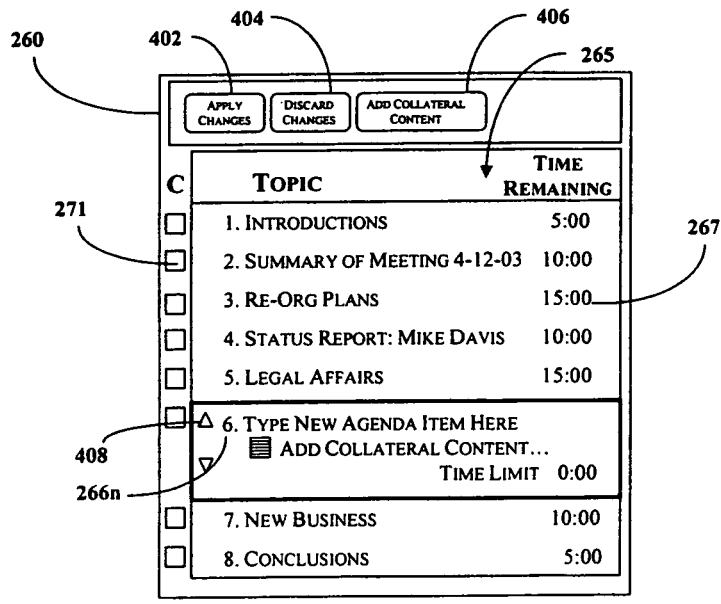
FIG. 4 is an illustration of an exemplary agenda interface as it may exist during creation of an active agenda, in accordance with certain embodiments of the present invention.

FIG. 4 is an illustration of an exemplary agenda interface 260 as it may exist during creation of an active agenda 265. The exemplary agenda interface 260 of FIG. 4 is displayed in response to activation of the "Add" button 304 shown in FIG. 3. The command buttons 270 displayed while a new agenda item 266*n* is being added and/or edited may include an "Apply Changes" button 402 for saving the new agenda item 266*n*, a "Discard Changes" button 404 for deleting the new agenda item 266*n* or rejecting modifications to the new agenda item 266*n*, and an "Add Collateral Content" button 406 for associating collateral content with the new agenda item 266*n*.

As shown in the example of FIG. 4, when a new agenda item 266*n* is added, default attributes are displayed. In this example, the default "topic" attribute is represented by the string 'Type New Agenda Item Here,' the default "time limit" attribute is set to the value '0:00,' and a default string 'Add New Collateral Content' is displayed as the "collateral content" attribute. The user may interact with the new agenda item 266*n* to change the default attributes as desired. Interactive controls, such as arrow controls 408 or the like, may optionally be provided for changing the position of the new agenda item 266*n* within the active agenda 265. In this example, it will be assumed that the "Discard Changes" button 404 is activated, so as to reject the new agenda item 266*n*. When the "Discard Changes" button 404 is activated the display reverts to the exemplary agenda interface 260 shown in FIG. 3.

Figure 5:
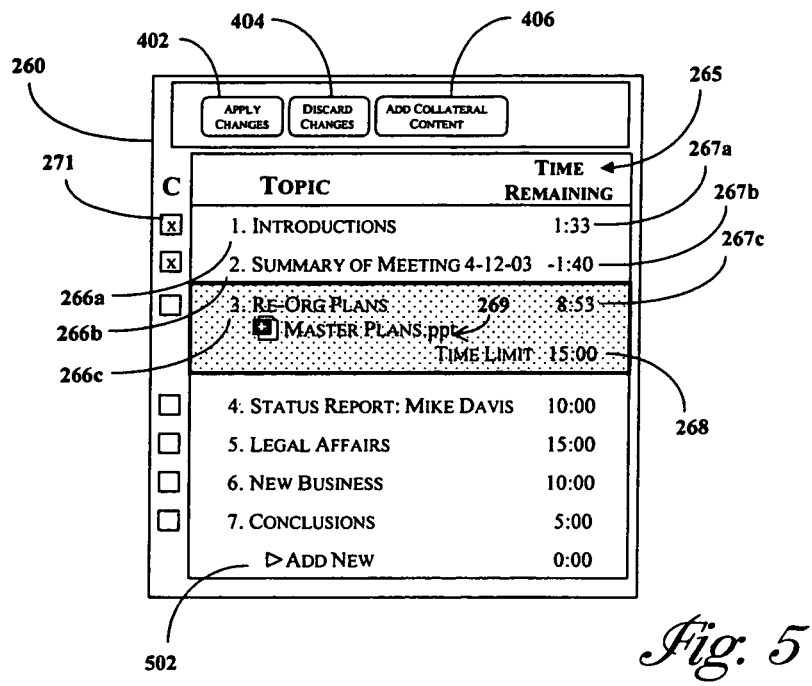
FIG. 5 is an illustration of an exemplary agenda interface as it may exist while an agenda item is being edited during a meeting, in accordance with certain embodiments of the present invention.

FIG. 5 is an illustration of an exemplary agenda interface 260 as it may exist while an agenda item 266*c* is being edited during a meeting. In this example, it is assumed that the active agenda 265 of FIG. 3 has been started by activation of the "Start Agenda" button 302. As shown, check boxes 271 & 272 may be displayed during a meeting to allow the user to mark an agenda item 266 as completed or postponed. In the illustrated example, check boxes 271 corresponding to the first agenda item 266*a* and the second agenda item 266*b* have been checked to mark those items as complete. The first agenda item 266*a* was completed with 1 minute 33 seconds remaining on its agenda item timer 267*a* and the second agenda item 266*b* was completed after its allotted 10 minutes of discussion time plus an additional 1 minute 40 seconds. The agenda item timer 267*b* corresponding to the second agenda item 266*b* displays "−1:40" to indicate the extra time. Elapsed time used may be displayed as an alternative or in addition to displaying time remaining.

When an agenda item 266, for example the second agenda item 266*b*, is marked complete, its corresponding agenda timer 267*b* is stopped and, by default, the next agenda item 266*c* may become current and active (i.e., its agenda timer 267 is initiated). An agenda item 266 other than the next successive agenda item 266*c* could also be manually activated if desired. In alternative embodiments, the active agenda module(s) 137 may be configured to await a user input command, such as a mouse click or the like, to indicate which agenda item 266 is the next to be made active.

The present example also assumes that the "Edit" button 306 (shown in FIG. 3) was activated with 8 minutes 53 seconds of discussion time remaining on the third agenda item timer 267. Activation of the "Edit" button 306 stops the agenda item timer 267c, causes the specified agenda item time limit 268 to be displayed, and caused the "Apply Changes" button 402, the "Discard Changes" button 404 and the "Add Collateral Content" button 406 to be displayed. In certain embodiments, activation of the "Edit" button 306 may also stop the meeting timer. In certain embodiments, activation of the "Edit" button 306 does not change the fact that time may have elapsed with respect to one or more agenda items. In certain embodiments the active agenda interface 260 may include "right-click" functionality for opening context menus. A context menu may provide another interactive control for invoking the agenda item edit mode or for adding, deleting, rearranging, etc. selected agenda items 266. In other embodiments, activation of the "Edit" button 306 may not cause the agenda item timer and/or the meeting timer to stop and/or may cause the user to be prompted to indicate whether the agenda item timer and/or the meeting timer should be stopped.

While editing an agenda item 266, for example the third agenda item 266c, the corresponding agenda item time limit 268 can be reset to a different time value. Other agenda items 266 may also be edited to manually redistribute any remaining time, if desired. In the agenda item edit mode, an "Add New" control 502 may be provided for adding a new agenda item 266. In the example of FIG. 5, the third agenda item 266c includes a PowerPoint file as collateral content 269. Those skilled in the art will appreciate that any type of file or object can constitute collateral content 269. Collateral content 269 may be stored and displayed locally by each computing device participating in the meeting, or may be stored at a remote storage for retrieval before, during and/or after the meeting. For the purposes of this present example, it will be assumed that no additional collateral content 269 is added to the third agenda item 266c and that the edit mode is terminated by activation of the "Discard Changes" button 402, which causes the display to revert to the exemplary agenda interface 260 shown in FIG. 3.

Figure 6:
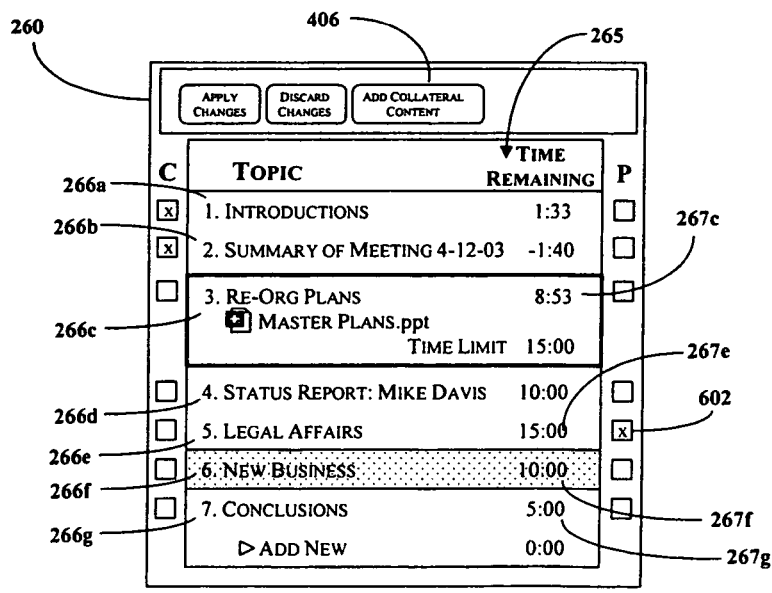
FIG. 6 is an illustration of an exemplary agenda interface that includes interactive controls for editing agenda items and marking agenda items as postponed, in accordance with certain embodiments of the present invention.

FIG. 6 continues the examples discussed above and illustrates that an agenda item 266, for example the fifth agenda item 266e, may be marked as postponed by checking a corresponding check box 272. A postponed agenda item 266g, may be one that will not be discussed during the meeting or one for which a discussion will be completed at a later time. The time remaining on the agenda item timer 267e corresponding to a postponed agenda item 266e may optionally be subtracted from the meeting time or redistributed among the other non-completed and non-postponed agenda items 266. In certain embodiments, though not illustrated in the figures, marking an agenda item 266e as postponed may also cause a follow-up action item to be established. The follow-up action item may be, for example, an email or prompt presented to the meeting facilitator at a later time as a reminder to include the postponed agenda item 266e in a subsequent active agenda 265.

In certain embodiments, follow-up action items may be established for any agenda item 266, whether or not postponed, completed or active. As described, follow-up action items may be automated by the agenda program module(s) 137 (e.g., generating an email or prompt after a certain time interval or forwarding a document or file to a meeting participant.) In that case, the active agenda program module(s) 137 may include functionality for performing the follow-up action items or may interface with other program modules 135 (e.g., an email client, calendar application, application server) to manage or request the performance of follow-up action items. Follow-up action items may also be performed by the meeting facilitator, or another person. Accordingly, establishing a follow-up action item for an agenda item 266 may involve associating a note or comment with the agenda item 266 as a reminder that a follow-up action is required.

The exemplary agenda interface 260 of FIG. 6 also illustrates that an agenda item 266, for example the third agenda item 266c, may be edited even when it is not the "current" agenda item 266. In this example, the first two agenda items 266a-b were completed, the third agenda item 266c was skipped or "paused" with 8 minutes 53 seconds remaining on its agenda item timer 267c, the fourth agenda item 266d was skipped and the fifth agenda item 266e was postponed. Upon postponement of the fifth agenda item 266e, the sixth agenda item 266f became the current agenda item 266. However, before the agenda item timer 266f of the sixth agenda item 266f became active, the user activated the "Edit" button 306 (shown in FIG. 3) and selected the third agenda item 266c for editing.

FIG. 7 illustrated an exemplary agenda interface 260 that may be displayed in response to activation of the "Add Collateral Content" button 406 (see FIG. 6) when an active agenda item 266c is being edited. Activation of the "Add Collateral Content" button 406 may cause the active agenda program module(s) 137 to interface with a local and/or remote file system (not shown) to allow the user to select new collateral content 269n. The active agenda program module(s) 137 may include "drag-and-drop" functionality for adding new collateral content 269n to an agenda item 266c. Drag-and-drop functionality is widely understood in the art and is therefore not discussed further herein. Any other suitable methods for adding collateral content 269 to an agenda item 266 may be incorporated into the present invention. For the purposes of this present example, it will be assumed that any changes to the third agenda item 266c (e.g., the addition of the new collateral content 269n) are accepted by activation of the "Apply Changes" button 402, which causes the display to revert to the exemplary agenda interface 260 shown in FIG. 3. Any applied changes may be transmitted to any other networked computing devices participating in the meeting, so as to update each connected active agenda 265.

FIG. 8 illustrates an exemplary agenda interface 260 demonstrating that, in certain embodiments, the active agenda program module(s) 137 may include functionality for automatically redistributing time across non-complete and non-postponed agenda items 266. The active agenda program module(s) 137 may be configured to periodically redistribute "extra" time or may be configured to do so in response to an agenda item 266 being marked complete. Extra time may refer to the net time remaining on any agenda item timers 267 corresponding to completed or postponed agenda items. FIG. 8 also illustrates that a meeting timer 802 and a meeting time limit value 804 may optionally be displayed in an active agenda 265. In the illustrated example, the meeting timer 802 counts down from the meeting time limit value 804. The meeting time limit value 804 could be modified in the edit mode, if such a feature is desired.

In the example of FIG. 8, the active agenda program module(s) 137 are configured to redistribute extra time on a periodic basis. Prior to the first time redistribution, the first agenda item 266a is completed with 1 minute 33 seconds remaining on its agenda item timer 267a, the second agenda item 266b is completed with −1 minute 40 seconds remaining on its agenda item timer 267b, and the third agenda item 266c is completed with 3 minutes 07 seconds remaining on its agenda item timer 267c. Thus, the first three agenda items 266a-c result in a net of 3 minutes 00 seconds extra time. Also prior to the first time redistribution, the fifth agenda item 266e is postponed. The postponed agenda item 266e adds an additional 15 minutes (i.e., the amount of time remaining on its agenda item timer 267e) of extra time to the meeting, resulting in a total of 18 minutes 00 seconds of net extra time.

Upon the first redistribution of extra time, the fourth agenda item 266d, the sixth agenda item 266f and the seventh agenda item 266g remain uncompleted and not postponed. In the example of FIG. 8, the active agenda module(s) are configured to redistribute extra time evenly across any uncompleted and not postponed agenda items 266d, 266f & 266g. Thus, in the present example 6 minutes 00 seconds of extra time is added to each of the uncompleted and not postponed fourth agenda item 266d, sixth agenda item 266f and seventh agenda item 266g. In other embodiments, extra time may be redistributed in proportion to the relative length of time remaining on the agenda item timers 267 corresponding to uncompleted and not postponed agenda items 266. Other methods for redistributing extra time will occur to those of skill in the art. In still other embodiments, net extra time may be deducted from the meeting time limit value 804, there decreasing the overall time of the meeting.

FIG. 9 is a process flow diagram illustrating an exemplary method for creating an active agenda. The exemplary method 900 assumes that an agenda interface is displayed and that an edit/create mode has been invoked (see, for example, FIG. 4). The method begins at starting block 901 and progresses to step 902, where a new agenda item is created. As previously described an agenda item may have several attributes, such as a "topic" attribute, a "time limit" attribute, a "complete" attribute, a "current" attribute, a "postponed" attribute, a "collateral content" attribute, etc.

Upon creation, the agenda item attributes may be set to default values. Certain attributes, such as the "topic," "time limit" and "collateral content" attributes may be specified by the user during the creation of the agenda item. Accordingly, after the agenda item is created, the method moves to step 904, where the agenda item topic is specified. Then at step 906, an agenda item time limit may be specified.

Following on to step 908, a determination is made as to whether any collateral content is to be associated with the agenda item. If no collateral content is to be associated with the agenda item, the method skips ahead to step 916, which is described below. If collateral content is to be associated with the agenda item, the method advances to step 910, where a first collateral content item is specified. Specifying a collateral content item may involve attaching a file or other object to the agenda item or associating with the agenda item a link to the file or object. Such a link may be a hyperlink or a pointer to a local or remote memory storage location.

After a collateral content item is associated with the agenda item at step 910, access rights for the collateral content item may be set at step 912. Specific access rights may, for example, provide read, write and/or edit privileges to one or more specific meeting participants or other individuals, or one or more types of meeting participants or other individuals. (e.g., management-level participants, work-group members, etc.) Meeting participants and other individuals may be identified, for the purpose of setting access rights, by username, email alias, personal identification number, or some other suitable identifier. Access rights may also be set or modified during a meeting, if such flexibility is desired. Access rights may be set to default values, if desired. Access rights thus can allow the collateral content item to be shared among some or all of the meeting participants and any other individuals.

A shared collateral content item may be made available to some or all of the meeting participants for viewing and/or editing. Thus, meeting participants who view the active agenda on their own computing device prior to, during or after the meeting are able to access a shared collateral content item that may be or may have been referenced during the meeting. Those skilled in the art will appreciate that sharing a collateral content item may involve providing a copy of the item to each meeting participant or providing shared access to the item stored in a common storage location, such as a network database. A collateral content element that is not shared is accessible only by the meeting facilitator (or other designated individual) and can be displayed by that individual during the meeting if desired.

After setting access rights at step 912, the method proceeds to step 914. At step 914, a determination is made as to whether another collateral content item is to be added. If so, the method returns to step 910, where another collateral content item is selected. After adding another collateral content item, the method is repeated, as described above, from step 912 to step 914 until it is determined at step 914 that no additional collateral content items are to be added. When it is determined at step 914 that no additional collateral content items are to be added, the method advances to step 915.

At step 915, access rights for the agenda item may be set. Access rights may provide read, write and/or modify rights for one or more selected meeting participants or other individuals. Thus, the creator of the active agenda may use agenda item access rights, if desired, to ensure that only select individuals have the authority to modify the agenda item. Agenda item access rights may be set or changed during a meeting, if such flexibility is desired. Agenda item access rights may be set to a default value and may constitute agenda item attributes. After any access rights are set for the agenda item at step 915, the method advances to step 916.

At step 916 a determination is made as to whether another agenda item is to be added to the active agenda. If another agenda item is to be added, the method returns to step 902, where a new agenda item is created. After the new agenda item is created at step 902, the method is repeated from step 904 to step 916, as described above, until it is determined at step 916 that no additional agenda items are to be added to the active agenda. When it is determined at step 916 that no additional agenda items are to be added, the method advances to step 918.

At step 918 access rights may optionally be set for the active agenda. Again, access rights may provide read, write, and/or modify rights for one or more selected meeting participants or other individuals. Thus, the creator of the active agenda may use access rights, if desired, to ensure that only select individuals have the authority to modify the active agenda. Agenda access rights may be set or changed during a meeting, if such flexibility is desired.

Agenda access rights may constitute agenda-level attributes. Agenda access rights may be set to a default value if desired. In other embodiments, access rights may be specified only for individual agenda items but not for the active agenda, or for the active agenda but not individual agenda items. After agenda access rights are set (or not set) at step 918, the method ends at step 920.

FIG. 10 is a process flow diagram illustrating an exemplary method for managing a meeting using an active agenda. The meeting in the following example may involve a single computing device executing an active agenda tool. Alternatively, the meeting in the following example may be an on-line meeting between two or more connected computing devices, each executing an active agenda tool of the present invention. The active agenda tools executed by each connected computing device may be referred to herein as "connected active agendas" for brevity. The exemplary method 1000 assumes that an active agenda interface is displayed on each computing device connected to the meeting. The method begins at starting block 1001 and progresses to step 1002, where the meeting is initiated with the issuance of a command "start meeting timer" command to any connected active agendas.

Once the meeting timer is started, the method moves to step 1004, where the next agenda item that is not completed and not postponed is selected. Obviously, when the active agenda is activated for the first time, no agenda items will be completed or postponed. Selection of the agenda item activates its agenda item timer. In certain embodiments, a user input command may be provided to override that automatic selection of an agenda item.

Selection of an agenda item and activation of its agenda item timer may be recorded as changes to the agenda data. Any changes to the agenda data may be transmitted to all connected active agendas at step 1006, so that each active agenda may be updated accordingly. Next at step 1008, a determination is made as to whether the meeting facilitator or other authorized user desires to perform an operation on the selected agenda item. By way of example, the authorized user may be presented with the option to (i) use any collateral content items associated with the agenda item, (ii) edit the agenda item, (iii) postpone the agenda item for a later meeting, (iv) complete the agenda item, or (v) establish a follow-up action item for the agenda item. Other operations may be also be performed on a selected agenda item.

If it is determined at step 1008 that the authorized user does not choose to perform an operation on the selected agenda item, the method skips ahead to step 1022 to determine if the selected agenda item has been marked as completed or postponed. The selected agenda item may be marked as completed or postponed, for example, when the discussion or presentation relating to that agenda item is concluded or deferred to a later time. As long as the agenda item has not been marked as completed or postponed, the method moves to step 1023 to determine if the user desires to skip the currently selected agenda item. If the user does want to skip the currently selected agenda item, the method advances to step 1032, which is explained below. If the user does not want to skip the currently selected agenda item, the method returns to step 1008 to determine whether another operation is to be performed on the selected agenda item.

If it is determined at step 1008 that the authorized user chooses to perform an operation on the associated collateral content, the method moves to step 1010. At step 1010 the authorized user is able to display and/or interact with the collateral content as desired. Next the method advances to step 1020, where any changed agenda data resulting from the use of the collateral content is transmitted to any connected active agendas. From step 1020, the method proceeds to step 1022 to determine if the selected agenda item has been marked as completed or postponed. As long as the agenda item has not been marked as completed or postponed, the method moves to step 1023 to determine if the user desires to skip the currently selected agenda item. If the user does want to skip the currently selected agenda item, the method advances to step 1032, which is explained below. If the user does not want to skip the currently selected agenda item, the method returns to step 1008 to determine whether another operation is to be performed on the selected agenda item.

If it is determined at step 1008 that an edit operation is to be performed on the selected agenda item, the method moves to step 1012. At step 1012 the authorized user is able to edit the agenda item topic, add collateral content, add sub-agenda items, change the agenda time limit, reset the agenda item timer, etc. From step 1012, the method moves to step 1020, where any changed agenda data caused by editing the selected agenda item is transmitted to any connected active agendas. As described above, the method advances from step 1020 to step 1022 for a determination as to whether the selected agenda item has been marked as completed or postponed. As long as the agenda item has not been marked as completed or postponed, the method moves to step 1023 to determine if the user desires to skip the currently selected agenda item. If the user does want to skip the currently selected agenda item, the method advances to step 1032, which is explained below. If the user does not want to skip the currently selected agenda item, the method returns to step 1008 to determine whether another operation is to be performed on the selected agenda item.

If it is determined at step 1008 that the authorized user desires to perform an operation to establish a follow-up action item for the selected agenda item, the method moves to step 1014. At step 1014 the authorized user interacts with the provided user interface controls to establish the desired follow-up action item. As described previously, a follow-up action item may be an automated task performed or managed by the active agenda tool, or may be a reminder note or comment attached to the agenda item. Other types of follow-up action items are equally possible. From step 1014, the method moves to step 1020, where any changed agenda data caused by establishing the follow-up action item is transmitted to any connected active agendas. As described above, the method advances from step 1020 to step 1022 for a determination as to whether the selected agenda item has been marked as completed or postponed. As long as the agenda item has not been marked as completed or postponed, the method moves to step 1023 to determine if the user desires to skip the currently selected agenda item. If the user does want to skip the currently selected agenda item, the method advances to step 1032, which is explained below. If the user does not want to skip the currently selected agenda item, the method returns to step 1008 to determine whether another operation is to be performed on the selected agenda item.

If it is determined at step 1008 that the authorized user desires to perform a postpone operation on the selected agenda item, the method proceeds to step 1016. At step 1016 the agenda item is marked as postponed. It is assumed in this example that a postponed agenda item is to be ignored for the duration of the present meeting, but possibly revisited at a later meeting. In other embodiments, postponed agenda items may be revisited during the present meeting if desired. From step 1016, the method proceeds to step 1020, where any changed agenda data caused by marking the selected agenda item as postponed is transmitted to any connected active agendas. As described above, the method advances from step 1020 to step 1022 for a determination as to whether the selected agenda item has been marked as completed or postponed. When it is determined at step 1022 that the selected agenda item has been marked as postponed, the method advances to step 1024, which is described below.

If it is determined at step 1008 that the authorized user desires to perform a completion operation on the selected agenda item, the method proceeds to step 1018. At step 1018 the agenda item is marked as completed. It is assumed in this example that a completed agenda item will not be revisited during the present meeting, though it would be possible to implement such a feature if desired. From step 1018, the method advances to step 1020, where any changed agenda data caused by marking the selected agenda item as completed is transmitted to any connected active agendas. As described above, the method advances from step 1020 to step 1022 for a determination as to whether the selected agenda item has been marked as completed or postponed. When it is determined at step 1022 that the selected agenda item has been marked as completed, the method advances to step 1024, which is described below.

At step 1024 any "extra" time remaining for the completed agenda item is determined. As one example, "extra" time may be a positive value representing unused time allotted to the agenda item, or may be a negative value representing the amount of time by which an agenda time limit was exceeded. Extra time may optionally be displayed in the active agenda. Each connected active agenda may independently determine extra time, so it may not be necessary to transmit changed agenda data at this point. Conversely, it may be desirable to transmit changed agenda data relating to extra time, so as to synchronize each connected active agenda.

After extra time is determined at step 1024, a determination is made at step 1026 as to whether extra time should be redistributed to remaining agenda items. Extra time may be redistributed, so as to preserve a specified meeting time limit. Extra time may be redistributed upon completion of each agenda item, or at designated time intervals. Of course, it may be desirable not to redistribute extra time at all.

If it is determined at step 1026 that extra time is not to be redistributed, the method proceeds to step 1032, which is explained below. However, if it is determined at step 1026 that extra time is to be redistributed, the method proceeds to step 1028, where the time limits of each agenda item that is not completed and not postponed are adjusted. Time limits may be adjusted in equal amounts with the extra time being evenly divided, may be adjusted in proportion to the relative durations of the time limits or may be distributed according to any other suitable method. After redistributing extra time at step 1028, the method proceeds to step 1030, where any changed agenda data caused by redistributing extra time is transmitted to any connected active agendas. From step 1030, the method moves to step 1032, which is described below.

At 1032 a determination is made as to whether the user desires to terminate the active agenda. If the user does not desire to terminate the active agenda, the method advances to step 1034 for a determination as to whether the user desires to add a new agenda item. If the user does desire to add a new agenda item, the method proceeds to step 900 (see FIG. 9), where the new agenda item is added. Then at step 1036, a determination is made as to whether the user desires to activate the new agenda item. If so, the agenda item time of the new agenda item is activated at step 1038 and the method returns to step 1006, where the changed agenda data is transmitted to any connected active agendas. The method is then repeated from step 1006 as described above.

If it is determined at step 1034 that the user does not desire to add a new agenda item or if it is determined at step 1036 that the user does not desire to activate the new agenda item, the method returns to step 1004, where the next agenda item that is not completed or postponed is selected. Selection of the next agenda item initiates its agenda item timer. The method is then repeated from step 1004, as previously described, until it is finally determined at step 1032 that the user desires to terminate the active agenda. When it is finally determined at step 1032 that the user desires to terminate the active agenda, the method ends at step 1040.

Based on the foregoing, it can be seen that the present invention provides systems, methods and interfaces for an active agenda tool used for managing meetings. Many other modifications, features and embodiments of the present invention will become evident to those of skill in the art. For example, the agenda tool of the present invention may itself be implemented as collateral content associated with another object, such as an email message. It should also be appreciated, therefore, that many aspects of the present invention were described above by way of example only and are not intended as required or essential elements of the invention, unless explicitly stated otherwise. In particular, the above described graphical user interfaces, interactive controls, data structures, and process flows were provided strictly by way of illustration and are not intended to be, in and of themselves, limitations of the present invention. Accordingly, it should be understood that the foregoing relates only to certain embodiments of the invention and that numerous changes may be made therein without departing from the spirit and scope of the invention as defined by the following claims.

What is claimed is:

1. One or more non-transitory computer-readable storage mediums storing computer-executable instructions for controlling networked computing devices to manage a meeting of a plurality of participants each having a participant networked computing device, each participant networked computing device executing an active agenda tool configured to access a central storage location, by a method comprising:

updating the active agenda tool of at least a first networked computing device of a first participant by downloading an agenda with agenda items and participant access rights for the agenda and at least one of the agenda items from a central storage location via a computer network, wherein the central storage location receives the agenda and the participant access rights from a second networked computer device of a second participant;

displaying at the first networked computing device the agenda having the agenda items for the meeting within a user interface, the user interface generated via the active agenda tool executed by the first networked computing device, wherein the user interface includes at least one interactive control for invoking an edit mode for the agenda and at least one selected agenda item;

adjusting, by the active agenda tool of the first networked computing device, edit functions of the at least one interactive control for invoking an edit mode of the at least one selected agenda item based on the participant access rights for the first participant and the at least one selected agenda item;

when the first participant at the first networked computing device indicates to start the meeting,
  sending an indication to the central storage location that the meeting has started;
  starting a meeting timer maintained by the first networked computing device for the meeting; and sending to the central storage location updates to a remaining time of the meeting, wherein the central storage location is accessed by other networked computing devices to receive, based on the access rights for the agenda, the indication that the meeting has started and the updates to the remaining time of the meeting, wherein the other networked computing devices synchronize a meeting timer maintained by the other networked computing devices with the updates to the remaining time of the meeting accessible through the central storage location;

when the first participant at the first networked computing device indicates that an agenda item is active,
sending to the central storage location an indication that the agenda item is active;
starting an agenda item timer maintained by the first networked computing device for the agenda item; and
sending to the central storage location updates to a remaining time of the agenda item, wherein the central storage location is accessed by the other networked computing devices to receive, based on the access rights for the agenda, the indication that the agenda item is active and the updates to the remaining time of that agenda item, wherein the other networked computing devices synchronize an agenda item timer maintained by the other networked computing devices with the updates to the remaining time of the agenda item accessible through the central storage location;

when the first participant at the first networked computing device indicates to invoke the edit mode for an agenda item after the meeting has started via the at least one interactive control,
determining whether the first participant is authorized to invoke the edit mode for that agenda item based on the first participant and the participant access rights for that agenda item;
when the first participant is authorized to invoke the edit mode for that agenda item,
receiving, from the first participant, a modification at the first networked computing device to the agenda item of the received agenda and storing the modification at the first networked computing device; and
in response to receiving input from the first participant to apply the modification, transmitting the modification to update the user interface generated via the active agenda tool executed by the other networked computing devices; and receiving at the first networked computing device from the central storage location an indication that the meeting has started as indicated by another networked computing device, updates to the remaining time of the meeting as updated by another networked computing device, an indication that an agenda item is active as indicated by another networked computing device, updates to remaining time of an agenda item as updated by another networked computing device, and a modified agenda time as modified by another networked computing device.

2. The one or more non-transitory computer-readable storage mediums of claim 1 wherein one or more of the agenda items has associated collateral content that is displayed during the meeting.

3. The one or more non-transitory computer-readable storage mediums of claim 2 wherein the access rights indicate whether the first participant has a write privilege to the collateral content during the meeting.

4. The computer-readable storage medium of claim 2 wherein when the participant indicates that an agenda item with collateral content is active, the method further comprises automatically displaying the collateral content.

5. The computer-readable storage medium of claim 2 wherein when the participant indicates that an agenda item with collateral content is active, the method further comprises displaying a link to the collateral content.

6. The computer-readable storage medium of claim 2 wherein the agenda item associated with collateral content includes a link to a copy of the collateral content stored at a network storage device wherein the link is retrieved from the central storage location.

7. The computer-readable storage medium of claim 2 wherein access to collateral content associated with an agenda item is controlled based on access rights of the participants.

8. The computer-readable storage medium of claim 7 wherein the access rights indicate whether a participant has a read privilege to the collateral content associated with an agenda item.

9. The computer-readable storage medium of claim 7 wherein the access rights indicate whether a participant has a write privilege to the collateral content associated with an agenda item.

10. The one or more non-transitory computer-readable storage mediums of claim 1 wherein the agenda items are displayed in a hierarchical format on the agenda.

11. The one or more non-transitory computer-readable storage mediums of claim 1 further including establishing a follow-up action item for at least one of the agenda items.

12. The computer-readable storage medium of claim 11 further comprising automatically sending to a participant after a time interval an email relating to the follow-up action item.

13. The computer-readable storage medium of claim 1 wherein the method further comprises when an elapse time for an agenda item is greater or less than a specified time limit for the agenda item, automatically adjusting time limits of remaining agenda items according to the difference between the elapsed time and the specified time limit.

14. A method performed by a networked computing device to manage a meeting of a plurality of participants each having a participant networked computing device executing an active agenda tool configured to access a central storage location, the method comprising:
updating the active agenda tool of at least a first networked computing device of a first participant by downloading an agenda with agenda items and participant access rights for the agenda and at least one of the agenda items from a central storage location via a computer network, wherein the central storage location receives the agenda and the participant access rights from one of the plurality of participants;
displaying at the first networked computing device the agenda for the meeting within a user interface, the user interface generated via the active agenda tool executed by the first networked computing device, wherein the user interface includes at least one interactive control for invoking an edit mode for the agenda and at least one selected agenda item;
adjusting, by the active agenda tool of the first networked computing device, edit functions of the at least one interactive control for invoking an edit mode of the at least one selected agenda item based on the participant access rights for the first participant and the at least one selected agenda item;

when the first participant at the first networked computing device indicates to start the meeting to discuss the agenda items of the agenda, sending an indication to the central storage location and displaying one or more agenda items that the meeting has started, wherein the networked computing device of each of the plurality of participants accesses the central storage location to synchronize a meeting timer maintained by the networked computing device with the start of the meeting maintained in the central storage location;

when the first participant at the first networked computing device indicates to invoke the edit mode for an agenda item after the meeting has started via the at least one interactive control, determining whether the first participant is authorized to invoke the edit mode for that agenda item based on the first participant and the participant access rights for that agenda item;

when the first participant is authorized to invoke the edit mode for that agenda item, receiving, from the first participant, a modification at the first networked computing device to the agenda item of the received agenda and storing the modification at the first networked computing device; and in response to receiving input from the first participant to apply the modification, transmitting the modification to update the user interface generated via the active agenda tool executed by the other networked computing device.

15. The method claim 14 wherein one or more of the agenda items has associated collateral content that may be displayed during the meeting.

16. The method of claim 15 wherein collateral content has a write privilege indicating which participants are authorized to modify the collateral content during the meeting.

17. The method of claim 14 wherein the agenda items are displayed in a hierarchical format on the agenda.

18. The method of claim 14 wherein agenda items have time limits and the method further comprises, during the meeting, when an agenda item consumes a different amount of time than its time limit, automatically adjusting the time limits of other agenda items and sending the adjusted time limits to the central storage location.

19. The method of claim 14 further comprising receiving from the participant an indication to change access rights of the other participant for modifying the agenda item during the meeting.

20. A plurality of networked computing devices for managing a meeting having participants who each have a participant network computing device executing an active agenda tool configured to access a central storage location storing an agenda with agenda items for the meeting and access rights for the agenda and at least one of the agenda items, each network computing device comprising:

one or more non-transitory computer-readable storage mediums storing computer-executable instructions comprising:

instructions that access from the central storage location the agenda with the agenda items for the meeting and participant access rights for the agenda and at least one of the agenda items to update the active agenda tool of the networked computing device;

instructions that display at the networked computing device the agenda having the agenda items for the meeting within a user interface, the user interface generated via the active agenda tool executed by the networked computing device, wherein the user interface includes at least one interactive control for invoking an edit mode for the agenda and at least one selected agenda item;

instructions that adjust, by the active agenda tool of the networked computing device, edit functions of the at least one interactive control for invoking an edit mode of the selected one of the agenda items based on the participant access rights for the participant and the at least one selected agenda item;

instructions that, when the participant at the networked computing device indicates to start the meeting, send from the networked computing device to the central storage location an indication that the meeting has started;

start a meeting timer maintained by the networked computing device for the meeting; and send to the central storage location updates to the meeting timer, wherein the central storage location is accessed accessible by each networked computing device to receive, based on the access rights for the agenda, the indication that the meeting has started and the updates to the meeting timer, wherein each networked computing device synchronizes a meeting timer maintained by the networked computing device with updates to the meeting timer accessible through the central storage location;

instructions that, when an indication that the meeting has started is received from the central storage location receive the meeting timer from the central storage location at the networked computing device;

instructions that, when the participant at the networked computing device indicates to invoke the edit mode for an agenda item after the meeting has started via the at least one interactive control, determining whether the participant is authorized to invoke the edit mode for that agenda item based on the participant and the participant access rights for that agenda item accessible through the central storage location;

when the participant is authorized to invoke the edit mode for that agenda item, receiving, from the participant, a modification at the networked computing device to the agenda item of the received agenda and storing the modification at the networked computing device; and in response to receiving input from the participant to apply the modification, transmitting the modification to update the user interface generated via the active agenda tool executed by the other networked computing devices;

instructions that, when an indication to modify the agenda is received from the central storage location, receive from the central storage location the modified agenda;

instructions that, when the participant indicates that an agenda item is active, start an agenda item timer maintained by the networked computing device for the agenda item, send to the central storage location an indication that the agenda item is active; and send updates to the agenda item timer to the central storage location, wherein the central storage location is accessed by each networked computing device to receive, based on the access rights for the agenda item, the indication that the agenda item has started and the updates to the agenda item timer, wherein each networked computing device synchronizes an agenda item timer maintained by the networked computing device with updates to the agenda item timer accessible through the central storage location; and instructions that, when an indication that an agenda item is active is received from the central storage location, receive from the central storage location updates to the agenda item timer so that the agenda timer and agenda item timer received by the networked computing device is synchronized with the meeting timer and the agenda timers received by the other networked computing devices; and a processor for executing the computer-executable instructions stored in the one or more non-transitory computer-readable storage medium.

21. The plurality of networked computing devices of claim 20 further comprising instructions that establish a follow-up action item and automatically send to a participant after a time interval an email relating to the follow-up action item.

* * * * *